United States Patent
Zhang et al.

(10) Patent No.: US 10,763,944 B2
(45) Date of Patent: Sep. 1, 2020

(54) TRANSMISSION METHOD USING DYNAMICALLY ADJUSTED BEAM SET, BASE STATION, AND TERMINAL

(71) Applicant: Huawei Technologies Co., Ltd., Shenzhen (CN)

(72) Inventors: Leiming Zhang, Beijing (CN); Ming Lei, Shenzhen (CN); Yifan Liu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/444,679

(22) Filed: Jun. 18, 2019

(65) Prior Publication Data

US 2019/0305839 A1 Oct. 3, 2019

Related U.S. Application Data

(63) Continuation of application No. PCT/CN2017/115609, filed on Dec. 12, 2017.

(30) Foreign Application Priority Data

Dec. 19, 2016 (CN) .......................... 2016 1 1180093

(51) Int. Cl.
*H04B 7/06* (2006.01)
*H04B 7/0408* (2017.01)
(Continued)

(52) U.S. Cl.
CPC ......... *H04B 7/0695* (2013.01); *H04B 7/0408* (2013.01); *H04B 7/0456* (2013.01);
(Continued)

(58) Field of Classification Search
CPC .. H04B 7/0408; H04B 7/0456; H04B 7/0473; H04B 7/0482; H04B 7/06; H04B 7/0617;
(Continued)

(56) References Cited

U.S. PATENT DOCUMENTS

| 2011/0274032 A1 | 11/2011 | Leng et al. |
| 2012/0328031 A1 | 12/2012 | Pajukoski et al. |

(Continued)

FOREIGN PATENT DOCUMENTS

| CN | 101729457 A | 6/2010 |
| CN | 103095324 A | 5/2013 |

(Continued)

OTHER PUBLICATIONS

"Overview on beam management," 3GPP TSG RAN WG1 #86-bis, Lisbon, Portugal, R1-1609080, pp. 1-5, 3rd Generation Partnership Project, Valbonne, France (Oct. 10-14, 2016).

(Continued)

*Primary Examiner* — Khanh C Tran
(74) *Attorney, Agent, or Firm* — Leydig, Voit & Mayer, Ltd.

(57) ABSTRACT

Embodiments of the present invention relate to a transmission method using a dynamically adjusted beam set, a base station, and a terminal. The method includes: sending, by the base station, first indication information to a terminal using first layer signaling, where the first indication information indicates a first beam set; sending, by the base station, second indication information to the terminal using second layer signaling, where the second indication information indicates at least one beam in the first beam set; and sending, by the base station, data to the terminal using the at least one beam.

20 Claims, 7 Drawing Sheets

(51) Int. Cl.
*H04B 7/0456* (2017.01)
*H04B 7/08* (2006.01)
*H04W 72/04* (2009.01)

(52) U.S. Cl.
CPC ............ *H04B 7/0473* (2013.01); *H04B 7/068* (2013.01); *H04B 7/0639* (2013.01); *H04B 7/088* (2013.01); *H04W 72/04* (2013.01); *H04B 7/0482* (2013.01)

(58) Field of Classification Search
CPC .... H04B 7/0639; H04B 7/068; H04B 7/0695; H04B 7/088; H04W 72/04
See application file for complete search history.

(56) References Cited

U.S. PATENT DOCUMENTS

| | | | |
|---|---|---|---|
| 2013/0109448 A1 | 5/2013 | Garrett et al. | |
| 2014/0044040 A1 | 2/2014 | Chen et al. | |
| 2014/0307662 A1* | 10/2014 | Zheng | H04W 24/10 370/329 |
| 2016/0072565 A1 | 3/2016 | Yu et al. | |
| 2017/0012692 A1 | 1/2017 | Kim et al. | |
| 2017/0141825 A1 | 5/2017 | Zhang et al. | |
| 2017/0339718 A1* | 11/2017 | Liu | H04B 1/7073 |
| 2017/0373738 A1* | 12/2017 | Chae | H04L 5/00 |
| 2018/0213429 A1* | 7/2018 | Zhang | H04W 24/02 |
| 2019/0075526 A1* | 3/2019 | Nagaraj | H04B 7/0408 |
| 2019/0199412 A1* | 6/2019 | Koskela | H04B 7/0417 |
| 2019/0373635 A1* | 12/2019 | Yang | H04W 74/0808 |

FOREIGN PATENT DOCUMENTS

| | | |
|---|---|---|
| CN | 104584476 A | 4/2015 |
| CN | 106031051 A | 10/2016 |
| WO | 2016019574 A1 | 2/2016 |

OTHER PUBLICATIONS

"On beam indication, measurement, and reporting," 3GPP TSG-RAN WG1 #90bis, Prague, Czech Republic, R1-1718433, pp. 1-9, 3rd Generation Partnership Project, Valbonne, France (Oct. 9-13, 2017).

* cited by examiner

TRANSMISSION METHOD USING DYNAMICALLY ADJUSTED BEAM SET, BASE STATION, AND TERMINAL

CROSS-REFERENCE TO RELATED APPLICATIONS

This application is a continuation of International Application No. PCT/CN2017/115609, filed on Dec. 12, 2017, which claims priority to Chinese Patent Application No. 201611180093.6, filed on Dec. 19, 2016. The disclosures of the aforementioned applications are hereby incorporated by reference in their entireties.

TECHNICAL FIELD

The present invention relates to the communications field, and in particular, to a transmission method using a dynamically adjusted beam set, a base station, and a terminal.

BACKGROUND

A fifth generation (5G) mobile communications system makes mobile data traffic increases, the Massive Internet of Things, diversified new services and application scenarios possible in the future. In addition to serving as a unified connection frame, basic 5G new radio (NR) of a new generation cellular network hopefully further increases a data speed, a capacity, a delay, reliability, efficiency, and a coverage capability of the network to a brand new level, and fully utilizes an available spectrum resource of each bit. The 5G designed based on orthogonal frequency division multiplexing (OFDM) new radio will become a global standard, support diversified deployment of 5G devices, and cover diversified spectrums (including coverage of low frequency bands and high frequency bands), and will further support diversified services and terminals.

Although high-frequency transmission provides more bandwidth, the high-frequency transmission has distinctive problems, for example, severe signal fading and a poor penetration capability. Currently, a transmission solution featuring massive multiple-input multiple-output (MIMO) beamforming is considered to enhance coverage of it and overcome the problem of severe fading. Solutions such as space frequency block coding (SFBC), semi-open-loop, and beam-cycling are used for overcoming a problem of a reduced penetration capability caused by blocking. In the foregoing solutions, beams may be beams in different directions, or a beam formed by beams in different directions.

Blocking is often unexpected, and a means of semi-static adjustment of a beam is used in an existing solution. The semi-static adjustment means that a beam set is indicated using higher layer signaling (for example, Radio Resource Control (RRC) signaling), and beam set adjustment takes a relatively long time. As a result, the semi-static adjustment cannot eliminate the signal fading problem caused by blocking. Beams in a beam set are fixed within a period of time, and even if one or more beams in the beam set are blocked, the beam set is still used for signal transmission. When detecting data, a terminal needs to detect most or all signals on each beam before obtaining correct information through channel decoding. If the one or more beams are blocked, signals carried on the one or more beams cannot be detected, the terminal loses most information, and the correct information cannot be restored even through the channel decoding. In particular, in a scenario of transmission by levels in medium and high modulation code rate schemes (MCS), the existing solution cannot overcome the signal fading problem caused by blocking.

SUMMARY

Embodiments of the present invention provide a transmission method using a dynamically adjusted beam set, a base station, and a terminal, to resolve a signal fading problem caused by blocking.

According to one aspect, a transmission method using a dynamically adjusted beam set is provided. A base station sends first indication information to a terminal using first layer signaling, where the first indication information indicates a first beam set; the base station sends second indication information to the terminal using second layer signaling, where the second indication information indicates at least one beam in the first beam set; and the base station sends data to the terminal using the at least one beam.

In this embodiment of the present invention, the base station sends information about the beam to the terminal using signaling of two layers, so that sending periods of the signaling of two layers can be different, a beam can be quickly adjusted conveniently, and signaling bits used for sending the information about the beam can be reduced. This can effectively resolve a signal fading problem caused by blocking.

In a possible implementation, the first layer signaling is higher layer signaling, and the second layer signaling is physical layer signaling or Media Access Control (MAC) layer signaling. According to this implementation, a period of the higher layer signaling is relatively long, and a period of the physical layer signaling or the MAC layer signaling is relatively short, so that the beam can be quickly adjusted conveniently.

In a possible implementation, after the sending, by the base station, data to the terminal using the at least one beam, the base station receives beam status information sent by the terminal, where the beam status information indicates whether each of the at least one beam is available. According to this implementation, the base station receives the beam status information fed back by the terminal, so that a real-time channel status is conveniently learned of, and the beam is adjusted accordingly.

In a possible implementation, the first indication information is a beam index of each beam in the first beam set or a codebook index of each beam in the first beam set.

In a possible implementation, the second indication information uses an indication manner of a bitmap that is based on the first beam set. According to this implementation, signaling resources used for dynamically adjusting the beam can be reduced when the two types of indication information are used in combination.

In a possible implementation, the at least one beam is two beams, and the base station determines two antenna ports based on the two beams; and the base station sends, based on the two antenna ports, the data to the terminal using a space frequency block coding (SFBC) technology.

In a possible implementation, the base station sends the data to the terminal by cyclically using the at least one beam, and sends a reference signal using a common port.

In a possible implementation, the base station sends the data and a reference signal to the terminal by cyclically using the at least one beam.

According to another aspect, a transmission method using a dynamically adjusted beam set is provided. A terminal receives first indication information from a base station using first layer signaling, where the first indication information indicates a first beam set; the terminal receives second indication information from the base station using second layer signaling, where the second indication information indicates at least one beam in the first beam set; and the terminal receives data from the base station using the at least one beam.

In a possible implementation, the first layer signaling is higher layer signaling, and the second layer signaling is physical layer signaling or MAC layer signaling.

In a possible implementation, after the receiving, by the terminal, data from the base station using the at least one beam, the terminal sends beam status information to the base station, where the beam status information indicates whether each of the at least one beam is available.

In a possible implementation, the first indication information is a beam index of each beam in the first beam set or a codebook index of each beam in the first beam set.

In a possible implementation, the second indication information uses an indication manner of a bitmap that is based on the first beam set.

In a possible implementation, the at least one beam is two beams, the terminal determines that an SFBC transmit diversity technology is used in a transmission method of the base station; and the terminal receives the data from the base station based on two antenna ports.

In a possible implementation, the terminal determines that a transmission method of the base station is sending the data by cyclically using the at least one beam and sending a reference signal using a common port; and the terminal receives the data from the base station by cyclically using the at least one beam, and receives the reference signal using the common port.

In a possible implementation, a minimum resource unit of a same beam used for receiving the data includes at least one of the following: a resource element, a symbol, and a resource block.

In a possible implementation, the terminal receives from the base station using the at least one beam, the data and a reference signal that are sent by the base station to the terminal by cyclically using the at least one beam.

In a possible implementation, a minimum resource unit of a same beam used for receiving the data and the reference signal is a resource block.

According to another aspect, an embodiment of the present invention provides a base station. The base station may implement a function performed by the base station in the foregoing method designs, and the function may be implemented using hardware, or may be implemented by hardware executing corresponding software. The hardware or the software includes one or more modules corresponding to the functions.

In a possible design, a structure of the base station includes a processor and a communications interface. The processor is configured to support the base station in performing a corresponding function in the foregoing methods. The communications interface is configured to support communication between the base station and a terminal or another entity. The base station may further include a memory. The memory is configured to be coupled to the processor, and the memory stores a necessary program instruction and data of the base station.

According to still another aspect, an embodiment of the present invention provides a terminal. The terminal can implement functions performed by the terminal in the foregoing method designs. The functions may be implemented using hardware, or may be implemented by hardware executing corresponding software. The hardware or the software includes one or more modules corresponding to the functions.

In a possible design, a structure of the terminal includes a processor and a communications interface. The processor is configured to support the terminal in performing a corresponding function in the foregoing method. The communications interface is configured to support communication between the terminal and a base station or another entity. The terminal may further include a memory. The memory is configured to be coupled to the processor, and the memory stores a necessary program instruction and data of the terminal.

According to still another aspect, an embodiment of the present invention provides a communications system. The system includes the base station and the terminal that are described in the foregoing aspects.

According to yet another aspect, an embodiment of the present invention provides a computer storage medium, configured to store a computer software instruction used by the foregoing base station, where the computer software instruction includes a program designed for performing the foregoing aspects.

According to yet another aspect, an embodiment of the present invention provides a computer storage medium, configured to store a computer software instruction used by the foregoing terminal, where the computer software instruction includes a program designed for performing the foregoing aspects.

According to yet another aspect, an embodiment of the present invention provides a computer program product. The computer program product includes an instruction, and when the program is executed by a computer, the instruction enables the computer to perform functions performed by the base station in the foregoing method designs.

According to yet another aspect, an embodiment of the present invention provides a computer program product. The computer program product includes an instruction, and when the program is executed by a computer, the instruction enables the computer to perform functions performed by the terminal in the foregoing method designs.

Compared with the current system, in the embodiments of the present invention, the base station sends the first indication information to the terminal using the first layer signaling, where the first indication information indicates the first beam set; the base station sends second indication information to the terminal using the second layer signaling, where the second indication information indicates the at least one beam in the first beam set; and the base station sends the data to the terminal using the at least one beam. It can be learned from the foregoing that, the information about the beam is sent to the terminal using the signaling of two layers, so that the sending periods of the signaling of two layers can be different, the beam can be quickly adjusted conveniently, and the signaling bits used for sending the information about the beam can be reduced. This can effectively resolve the signal fading problem caused by blocking.

DESCRIPTION OF EMBODIMENTS

To make the purpose, technical solutions, and advantages of the embodiments of the present invention clearer, the following clearly describes the technical solutions of the embodiments of the present invention with reference to the accompanying drawings and the embodiments in the embodiments of the present invention.

Figure 1:
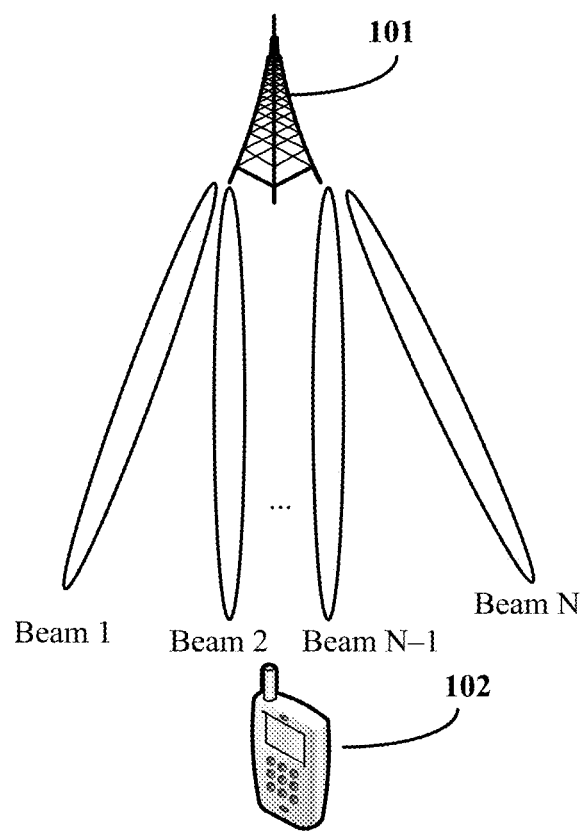
FIG. 1 is a schematic diagram of an application scenario on which a transmission method using a dynamically adjusted beam set is based according to an embodiment of the present invention.

FIG. 1 is a schematic diagram of an application scenario on which a transmission method using a dynamically adjusted beam set is based according to an embodiment of the present invention. Referring to FIG. 1, a MIMO communications technology is used between a base station 101 and a terminal 102. The base station 101 configures a set including N beams, and notifies the terminal 102 of the set using higher layer signaling. A beam in the beam set may be indicated using a beam index or a codebook index. There is a correspondence between the codebook index and the beam. For example, the codebook index may be a precoding matrix indicator (PMI) in a Long Term Evolution (LTE) system. The base station 101 dynamically notifies the terminal 102 of M beams used in a current transmission. The M beams are a subset of the N beams. The base station 101 may dynamically indicate, in a manner of an N-bit bitmap, the M beams used in the current transmission. The base station 101 transmits data by cyclically using the M beams, and data forming may be performed at a resource element (RE) level, a symbol level, or a resource block level. Alternatively, the base station 101 transmits data using a transmit diversity based on the M beams. The terminal 102 receives beam configuration information from the base station 101, and detects data based on the beam configuration information. The terminal 102 performs a measurement feedback based on the M beams dynamically indicated by the base station 101.

Figure 2:
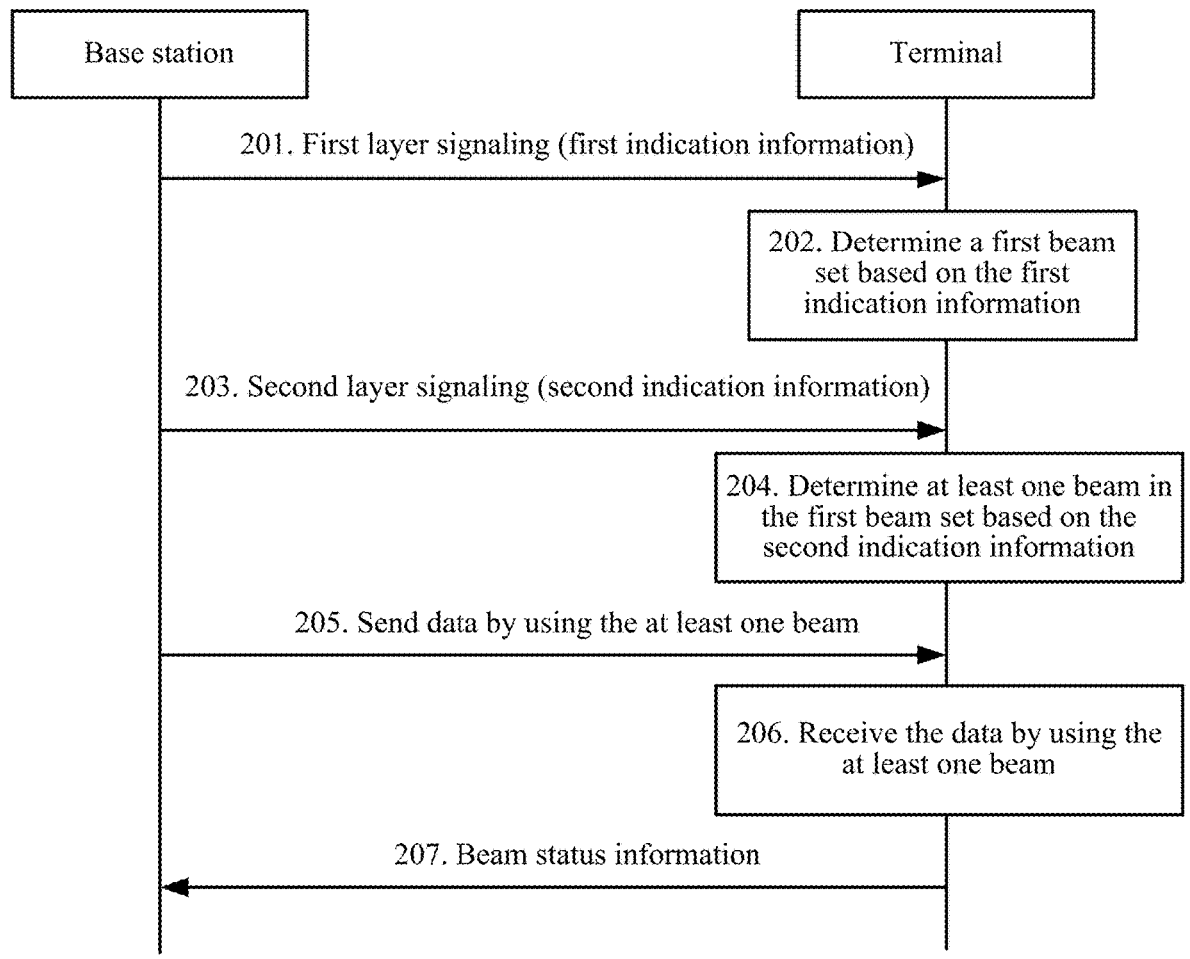
FIG. 2 is a schematic communication diagram of a transmission method using a dynamically adjusted beam set according to an embodiment of the present invention.

FIG. 2 is a schematic communication diagram of a transmission method using a dynamically adjusted beam set according to an embodiment of the present invention. The method may be based on the application scenario shown in FIG. 1. Referring to FIG. 2, the method includes the following steps.

Step 201: A base station sends first indication information to a terminal using first layer signaling, where the first indication information indicates a first beam set.

In an example, the first layer signaling is higher layer signaling, such as RRC signaling. The higher layer signaling is usually sent at a relatively long time interval.

In an example, the first indication information is a beam index of each beam in the first beam set or a codebook index of each beam in the first beam set.

Step 202: The terminal receives the first indication information from the base station using the first layer signaling, and determines the first beam set based on the first indication information.

Step 203: The base station sends second indication information to the terminal using second layer signaling, where the second indication information indicates at least one beam in the first beam set.

In an example, the second layer signaling is physical layer signaling or Media Access Control (MAC) layer signaling, such as scheduling signaling. The physical layer signaling or the MAC layer signaling is usually sent at a relatively short time interval, so that a used beam can be dynamically adjusted conveniently.

In an example, the second indication information uses an indication manner of a bitmap that is based on the first beam set. In this manner, 1 may be used to indicate that the beam is used, and 0 may be used to indicate that the beam is not used; or 0 may be used to indicate that the beam is used, and 1 may be used to indicate that the beam is not used, so that a signaling transmission resource can be effectively saved.

Step 204: The terminal receives the second indication information from the base station using second layer signaling, and determines the at least one beam in the first beam set based on the second indication information.

Step 205: The base station sends data to the terminal using the at least one beam.

In an example, the at least one beam is two beams, and the base station determines two antenna ports based on the two beams; and the base station sends, based on the two antenna ports, the data to the terminal using a space frequency block coding (SFBC) technology.

In another example, the base station sends the data to the terminal by cyclically using the at least one beam and sending a reference signal using a common port. A minimum resource unit of a same beam used for sending the data includes at least one of the following: a resource element, a symbol, and a resource block. When many beams are used for sending the data to the terminal, sending the reference signal using the common port can reduce a quantity of ports used for sending the reference signal, thereby effectively saving a transmission resource.

In still another example, the base station sends the data and a reference signal to the terminal by cyclically using the at least one beam. Preferably, a minimum resource unit of a same beam used for sending the data and the reference signal is a resource block. If a same resource block may include a plurality of beams, and each beam needs to be used for sending a corresponding reference signal, overheads of the reference signal are very large. Therefore, selecting the resource block as the minimum resource unit can reduce the overheads of the reference signal as far as possible.

Step 206: The terminal receives the data from the base station using the at least one beam.

In this embodiment of the present invention, the base station may send, to the terminal, a piece of signaling that indicates a transmission method, and the terminal determines the transmission method of the base station based on the signaling.

In an example, the at least one beam is two beams, the terminal determines that an SFBC transmit diversity technology is used in a transmission method of the base station; and the terminal receives the data from the base station based on two antenna ports.

The base station may send, to the terminal, a piece of signaling that indicates the transmission method, and the terminal determines, based on the signaling, that the SFBC transmit diversity technology is used in the transmission method of the base station. In addition, one antenna port is corresponding to one beam. A reference signal on each antenna port occupies a specific resource. The terminal detects, on the specific resource, the reference signal on each antenna port, to obtain channel information on a corresponding antenna port or beam. For data, data of each antenna port is mapped to a corresponding time-frequency domain resource according to a predefined rule.

In another example, the terminal receives the data from the base station by cyclically using the at least one beam, and receives the reference signal using the common port. A minimum resource unit of a same beam used for receiving the data includes at least one of the following: a resource element, a symbol, and a resource block.

For example, the terminal receives, from the base station, the reference signal sent using the common port; determines channel information based on the reference signal; determines an equivalent channel of the at least one beam based on the channel information and information about the beam; and receives data from the base station through the equivalent channel.

In still another example, the terminal receives, from the base station using the at least one beam, the data and a reference signal that are sent by the base station to the terminal by cyclically using the at least one beam. A minimum resource unit of a same beam used for receiving the data and the reference signal is a resource block.

For example, the terminal receives the reference signal from the base station using the at least one beam; performs joint channel estimation on a reference signal in a minimum resource unit of the joint channel estimation; and receives data through an estimated channel.

Optionally, after step 206, the method further includes the following step:

Step 207: The terminal sends beam status information to the base station, where the beam status information indicates whether each of the at least one beam is available.

In an example, the beam status information is channel quality indication (CQI) information corresponding to each of the at least one beam.

In this embodiment of the present invention, the base station sends, to the terminal using the signaling of two layers, information about a beam used for transmitting data, so that sending periods of the signaling of two layers can be different, the beam can be quickly adjusted conveniently, and signaling bits used for sending information about the beam can be reduced. This can effectively resolve a signal fading problem caused by blocking.

Figure 3:
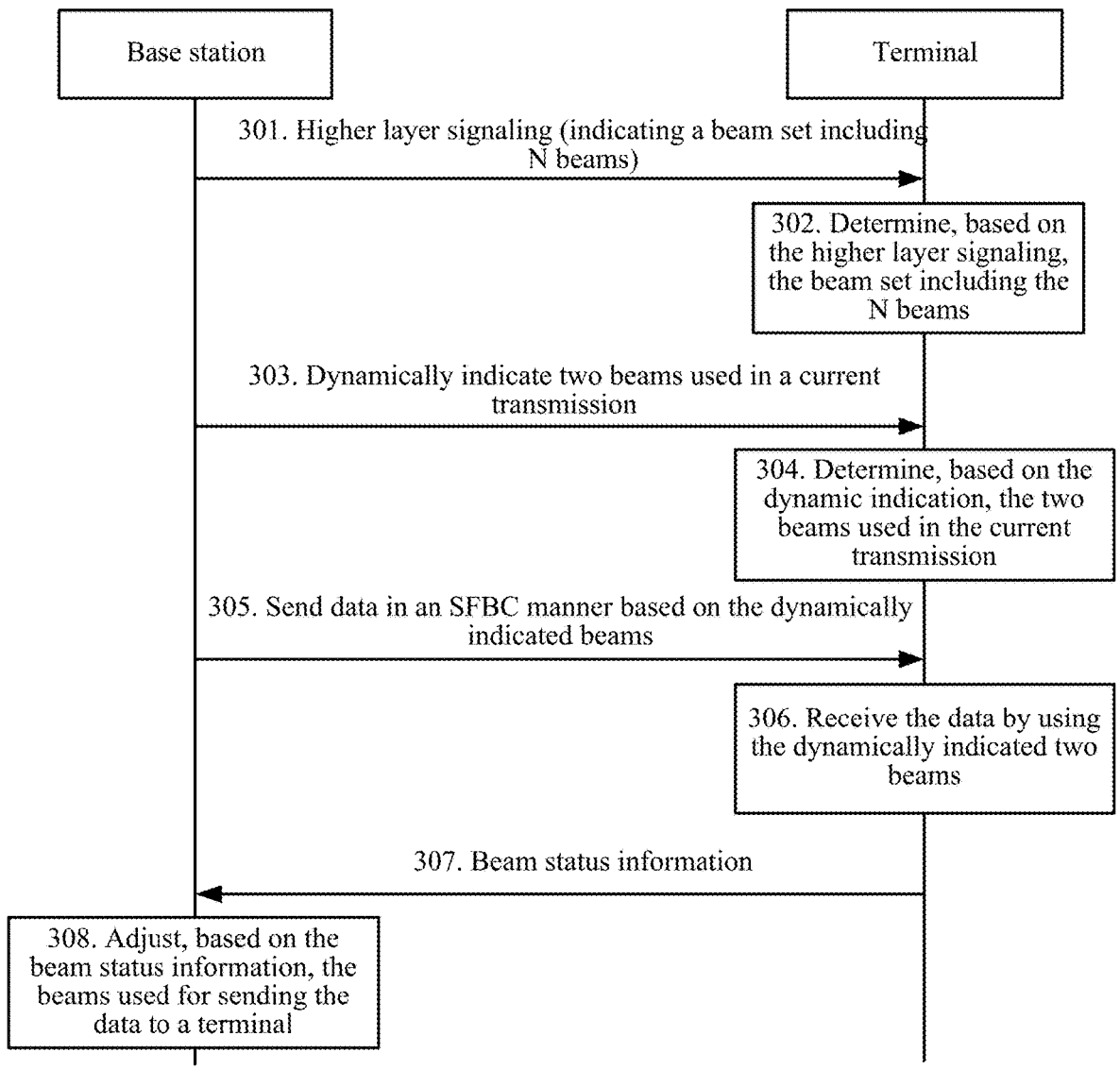
FIG. 3 is a schematic communication diagram of another transmission method using a dynamically adjusted beam set according to an embodiment of the present invention.

FIG. 3 is a schematic communication diagram of another transmission method using a dynamically adjusted beam set according to an embodiment of the present invention. The method may be based on the application scenario shown in FIG. 1, and an SFBC transmit diversity technology is specifically used for transmitting data. Referring to FIG. 3, the method includes the following steps.

Step 301: A base station configures a beam set including N beams, and notifies a terminal of the beam set using higher layer signaling.

In an example, a beam in the beam set may be indicated using a beam index or a codebook index.

In an example, the base station preferably selects the N beams {beam 1, beam 2, . . . , and beam N} based on a feedback from the terminal, to form the beam set. Usually, the N beams are isolated by certain space.

In an example, the base station may preferably select the N beams based on channel quality information, of each beam, fed back by the terminal. The channel quality information may include a CQI and/or an indication about whether a beam may continue to be used.

When the channel quality information includes only the CQI, a minimum level of the CQI may be parsed by the terminal as an indication indicating that the beam cannot continue to be used.

Step 302: The terminal receives the higher layer signaling sent by the base station, and determines, based on the higher layer signaling, the beam set including N beams.

Step 303: The base station dynamically notifies the terminal of two beams used in a current transmission, where the two beams are a subset of the N beams.

In an example, the base station may dynamically indicate, in a manner of an N-bit bitmap, the two beams used in the current transmission. For example, for [101 . . . 0], the signaling has a length of N, where 1 indicates that a beam is used, and 0 indicates that the beam is not used.

Step 304: The terminal receives a dynamic indication of the base station, and determines, based on the dynamic indication, the two beams used in the current transmission, where the two beams are the subset of the N beams.

Step 305: The base station virtualizes two antenna ports based on the beams of which the terminal is notified in step 303, and performs SFBC transmit diversity sending based on the two antenna ports.

Step 306: The terminal detects, based on the two beams that are used in the current transmission and that are determined according to step 302 and step 304, data sent by the base station.

Step 307: After detecting the data, the terminal reports beam status information to the base station. The beam status information indicates whether each of the two beams may continue to be used.

In an example, when the terminal detects that signal quality of a beam p is apparently inferior to signal quality of a beam q, or signal quality of a beam is lower than a receiving threshold, the terminal determines that the beam cannot be used.

In an example, the terminal may report the beam status information in the manner of the N-bit bitmap.

In another example, the terminal performs a measurement feedback based on the two beams that are dynamically indicated. The measurement feedback is a CQI measurement feedback that is based on the two beams.

Optionally, after step 307, the method further includes the following step:

Step 308: The base station adjusts the used beams based on the beam status information reported by the terminal.

For example, the beam set of which the base station notifies the terminal includes 10 beams, respectively identified as a beam 1 to a beam 10. Beams that are used in the current transmission and of which the base station notifies the terminal are the beam 1 and the beam 2. When the beam status information fed back by the terminal indicates that the beam 1 cannot be used, the base station may select one beam from the beam 3 to the beam 10 to replace the beam 1, and notify the terminal of the beam using scheduling signaling.

In this embodiment of the present invention, the base station dynamically adjusts a beam used in SFBC, to avoid that a severely faded beam is used for transmitting data. This helps increase a data transmission rate.

Figure 4:
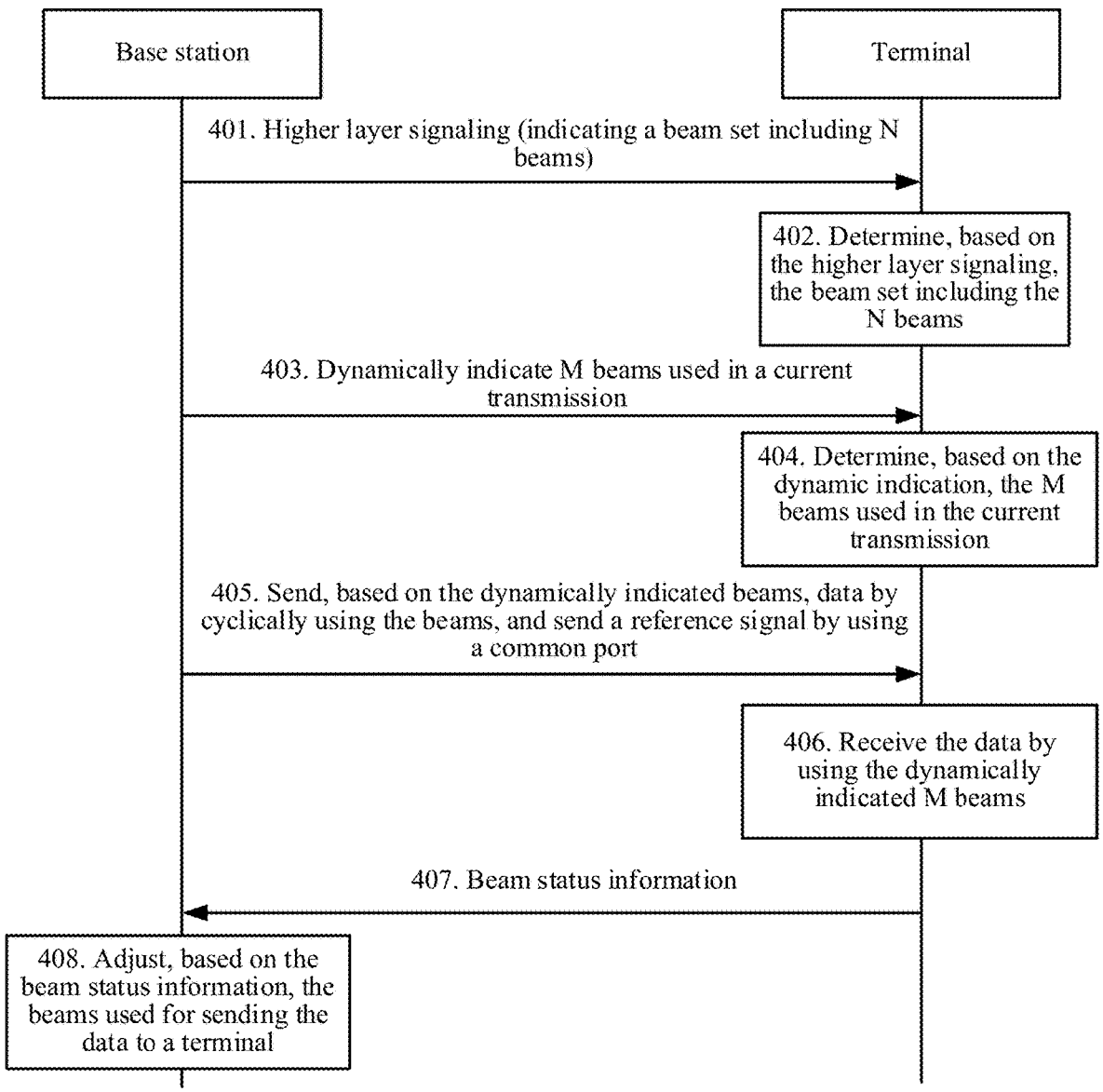
FIG. 4 is a schematic communication diagram of still another transmission method using a dynamically adjusted beam set according to an embodiment of the present invention.

FIG. 4 is a schematic communication diagram of still another transmission method using a dynamically adjusted beam set according to an embodiment of the present invention. The method may be based on the application scenario shown in FIG. 1, a technology of cyclically using a beam is specifically used for transmitting data, and a reference signal is sent using a common port. Referring to FIG. 4, the method includes the following steps.

Step 401: A base station configures a set including N beams, and notifies a terminal of the set using higher layer signaling.

In an example, a beam in the beam set may be indicated using a beam index or a codebook index.

In an example, the base station preferably selects the N beams {beam 1, beam 2, . . . , and beam N} based on a feedback from the terminal, to form the beam set. Usually, the N beams are isolated by certain space.

In an example, the base station may preferably select the N beams based on channel quality information, of each beam, fed back by the terminal. The channel quality information may include a CQI and/or an indication about whether a beam may continue to be used.

When the channel quality information includes only the CQI, a minimum level of the CQI may be parsed by the terminal as an indication indicating that the beam cannot continue to be used.

Step 402: The terminal receives the higher layer signaling sent by the base station, and determines, based on the higher layer signaling, the beam set including the N beams.

Step 403: The base station dynamically notifies the terminal of M beams used in a current transmission, where the M beams are a subset of the N beams.

In an example, the base station may dynamically indicate, in a manner of an N-bit bitmap, the M beams used in the current transmission. For example, for [101 . . . 0], the signaling has a length of N, where 1 indicates that a beam is used, and 0 indicates that the beam is not used.

Step 404: The terminal receives dynamic indication information of the base station, and determines, based on the dynamic indication information, the M beams used in the current transmission, where the M beams are the subset of the N beams.

Step 405: The base station transmits data by cyclically using the M beams of which the terminal is notified in step 403, and sends a reference signal using a common port.

Data forming may be performed at a RE level, a symbol level, or a resource block level.

The beams may be cyclically used in, but is not limited to, the following manner: For example, there are a total of three beams, namely, beams 1, 2, and 3; the beam 1 is first used, then the beam 2 is used, then the beam 3 is used, and then the beam 1 is used; in this way, the beams are cyclically used.

Step 406: The terminal detects, based on the M beams that are used in the current transmission and that are determined according to step 402 and step 404, data sent by the base station.

In an example, the terminal obtains an equivalent channel based on channel information measured using the reference signal and information about the beams indicated by the base station. The equivalent channel is used for data detection.

Step 407: After detecting the data, the terminal reports beam status information. The beam status information indicates whether each of the M beams may continue to be used.

In an example, when the terminal detects that signal quality of a beam p is apparently inferior to signal quality of a beam q, or signal quality of a beam is lower than a receiving threshold, the terminal determines that the beam cannot be used. For example, there are a total of M beams, and when a signal quality difference between any two beams is greater than a threshold, it is determined that a beam with poorer signal quality cannot be used.

In an example, the terminal may report the beam status information in the manner of the N-bit bitmap.

In another example, the terminal performs measurement feedback based on the M beams that are dynamically indicated. The measurement feedback is a CQI measurement feedback that is based on the M beams.

Optionally, after step 407, the method further includes the following step:

Step 408: The base station adjusts the used beams based on the beam status information reported by the terminal.

For example, the beam set of which the base station notifies the terminal includes 10 beams, respectively identified as a beam 1 to a beam 10. Beams that are used in the current transmission and of which the base station notifies the terminal are the beam 1, the beam 2, and the beam 3. When the beam status information fed back by the terminal indicates that the beam 1 and the beam 2 cannot be used, the base station may select two beams from the beam 4 to the beam 10 to replace the beam 1 and the beam 2, and notify the terminal of the beams using scheduling signaling.

In this embodiment of the present invention, the base station dynamically adjusts a beam that is used for transmitting data by cyclically using the beam, to avoid that a severely faded beam is used for transmitting the data. This helps increase a data transmission rate.

Figure 5:
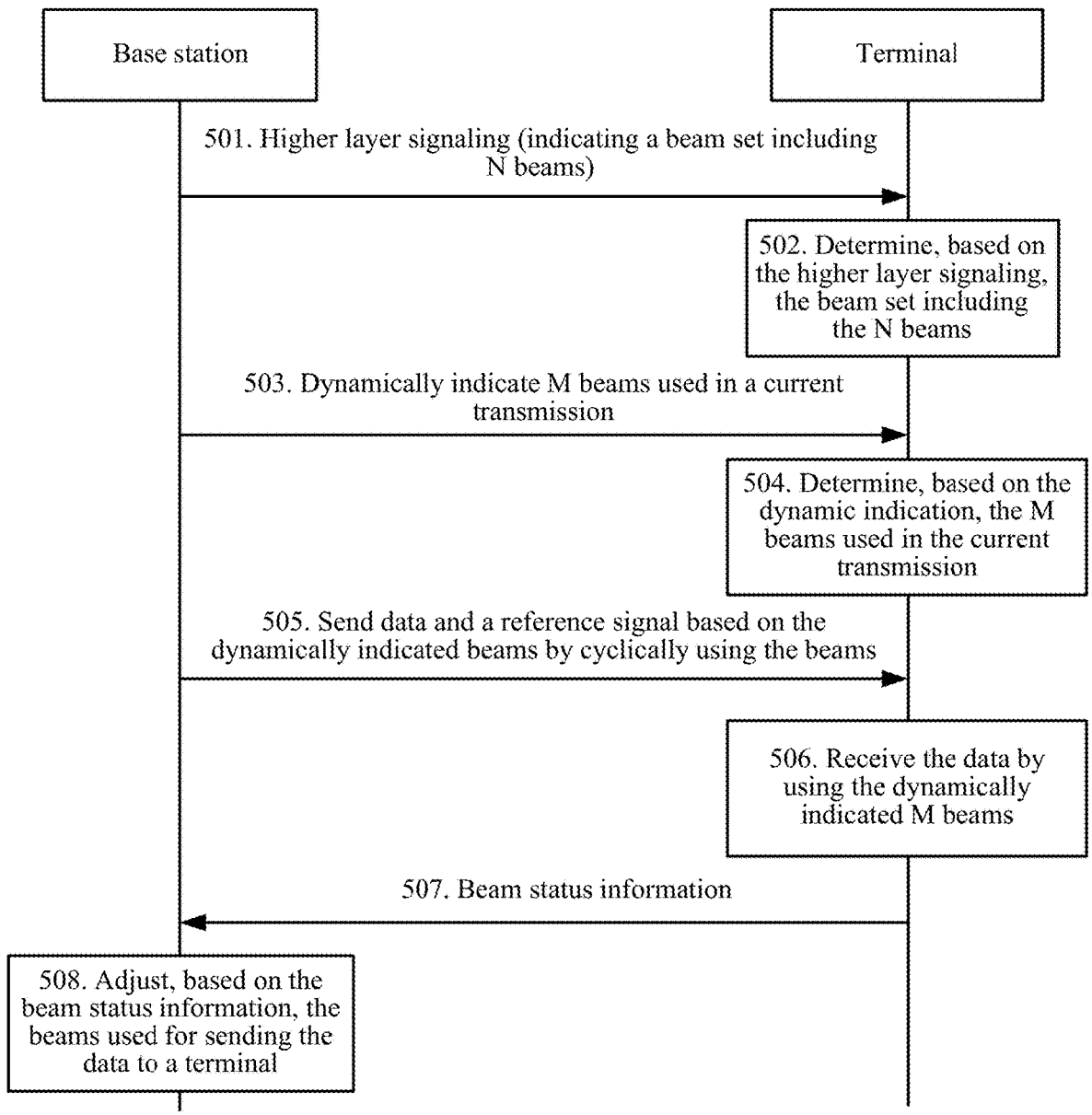
FIG. 5 is a schematic communication diagram of yet another transmission method using a dynamically adjusted beam set according to an embodiment of the present invention.

FIG. 5 is a schematic communication diagram of yet another transmission method using a dynamically adjusted beam set according to an embodiment of the present invention. The method may be based on the application scenario shown in FIG. 1, a technology of cyclically using a beam is specifically used for transmitting data, and a reference signal and the data are sent together using a selected beam. Referring to FIG. 5, the method includes the following steps.

Step 501: A base station configures a set including N beams, and notifies a terminal of the set using higher layer signaling.

In an example, a beam in the beam set may be indicated using a beam index or a codebook index.

In an example, the base station preferably selects the N beams {beam 1, beam 2, . . . , and beam N} based on a feedback from the terminal, to form the beam set. Usually, the N beams are isolated from each other by certain space.

In an example, the base station may preferably select the N beams based on channel quality information, of each beam, fed back by the terminal. The channel quality information may include a CQI and/or an indication about whether the beam may continue to be used.

When the channel quality information includes only the CQI, a minimum level of the CQI may be parsed by the terminal as an indication that the beam cannot continue to be used.

Step 502: The terminal receives the higher layer signaling sent by the base station, and determines, based on the higher layer signaling, the beam set including the N beams.

Step 503: The base station dynamically notifies the terminal of M beams used in a current transmission, where the M beams are a subset of the N beams.

In an example, the base station may dynamically indicate, in a manner of an N-bit bitmap, the M beams used in the current transmission. For example, for [101 . . . 0], the signaling has a length of N, where 1 indicates that a beam is used, and 0 indicates that the beam is not used.

Step 504: The terminal receives dynamic indication information of the base station, and determines, based on the dynamic indication information, the M beams used in the current transmission, where the M beams are the subset of the N beams.

Step 505: The base station transmits data and a reference signal by cyclically using the M beams of which the terminal is notified in step 503.

In an example, data forming may be performed a resource block level, and this can reduce resource consumption.

Step 506: The terminal detects, based on the M beams that are used in the current transmission and that are determined according to step 502 and step 504, data sent by the base station.

In an example, the terminal detects the data based on a channel measured using the reference signal. A granularity of joint channel estimation is consistent with a granularity of the data forming.

Step 507: After detecting the data, the terminal reports beam status information. The beam status information indicates whether each of the M beams may continue to be used.

In an example, when the terminal detects that signal quality of a beam p is apparently inferior to signal quality of a beam q, or signal quality of a beam is lower than a receiving threshold, the terminal determines that the beam cannot be used. For example, there are M beams in total, and when a signal quality difference between any two beams is greater than a threshold, it is determined that a beam with poorer signal quality cannot be used.

In an example, the terminal may report the beam status information in the manner of the N-bit bitmap.

In another example, the terminal performs measurement feedback based on the M beams that are dynamically indicated. The measurement feedback is a CQI measurement feedback that is based on the M beams.

Optionally, after step 507, the method further includes the following step:

Step 508: The base station adjusts the used beams based on the beam status information reported by the terminal.

For example, the beam set of which the base station notifies the terminal includes 10 beams, respectively identified as a beam 1 to a beam 10. Beams that are used in the current transmission and of which the base station notifies the terminal are the beam 1, the beam 2, and the beam 3. When the beam status information fed back by the terminal indicates that the beam 1 and the beam 2 cannot be used, the base station may select two beams from the beam 4 to the beam 10 to replace the beam 1 and the beam 2, and notify the terminal of the beams using scheduling signaling.

In this embodiment of the present invention, the base station dynamically adjusts a beam that is used for transmitting data by cyclically using the beam, to avoid that a severely faded beam is used for transmitting the data. This helps increase a data transmission rate.

A pilot mode in the embodiment shown in FIG. 4 is different from that in the embodiment shown in FIG. 5. In the embodiment shown in FIG. 4, a common pilot is used; and at a transmit end, the pilot does not need to be formed; and at a receive end, after the pilot is detected, an equivalent channel of data can be obtained only after the pilot is further multiplied by a forming matrix. In the embodiment shown in FIG. 5, a forming pilot is used; and at a transmit end, the pilot needs to be formed; and at a receive end, after the pilot is detected, an equivalent channel of data is directly obtained. The pilot is the reference signal.

Figure 6:
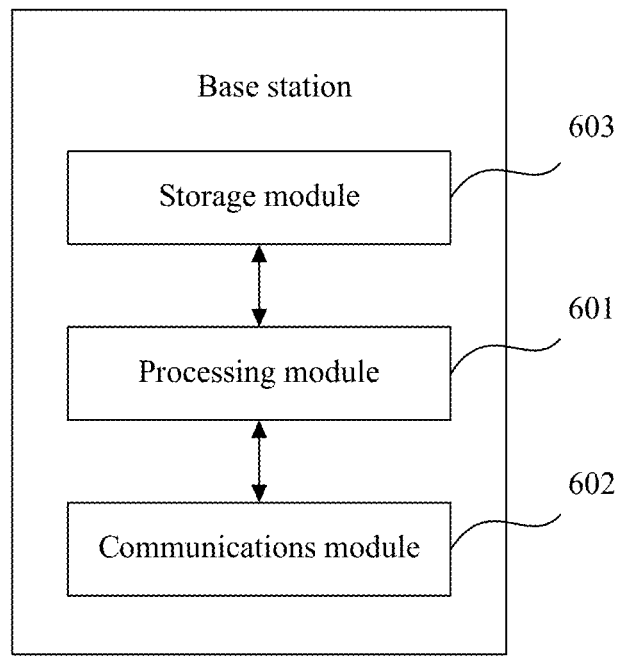
FIG. 6 is a structural diagram of a base station according to an embodiment of the present invention.

FIG. 6 is a structural diagram of a base station according to an embodiment of the present invention. The base station is configured to perform a transmission method using a dynamically adjusted beam set according to an embodiment of the present invention. The base station includes: a processing module 601 and a communications module 602.

The processing module 601 is configured to: control the communications module 602 to send first indication information to a terminal using first layer signaling, where the first indication information indicates a first beam set; control the communications module 602 to send second indication information to the terminal using second layer signaling, where the second indication information indicates at least one beam in the first beam set; and control the communications module 602 to send data to the terminal using the at least one beam.

In an example, the first layer signaling is higher layer signaling, and the second layer signaling is physical layer signaling or MAC layer signaling.

In an example, the processing module 601 is further configured to: after controlling the communications module 602 to send the data to the terminal using the at least one beam, control the communications module 602 to receive beam status information sent by the terminal, where the beam status information indicates whether each of the at least one beam is available.

In an example, the first indication information is a beam index of each beam in the first beam set or a codebook index of each beam in the first beam set.

In an example, the second indication information uses an indication manner of a bitmap that is based on the first beam set.

In an example, the at least one beam is two beams, and the processing module 601 is specifically configured to: determine two antenna ports based on the two beams; and control, based on the two antenna ports, the communications module 602 to send the data to the terminal using an SFBC transmit diversity technology.

In an example, the processing module 601 is specifically configured to control the communications module 602 to send the data to the terminal by cyclically using the at least one beam, and send a reference signal using a common port.

In an example, the processing module 601 is specifically configured to control the communications module 602 to send the data and a reference signal to the terminal by cyclically using the at least one beam.

The base station may further include a storage module 603, configured to store program code and data of the base station.

The processing module 601 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 602 may be a communications interface, a transceiver, a transceiver circuit, or the like. The communications interface is a general term, and may include one or more interfaces. The storage module 603 may be a memory.

Figure 7:
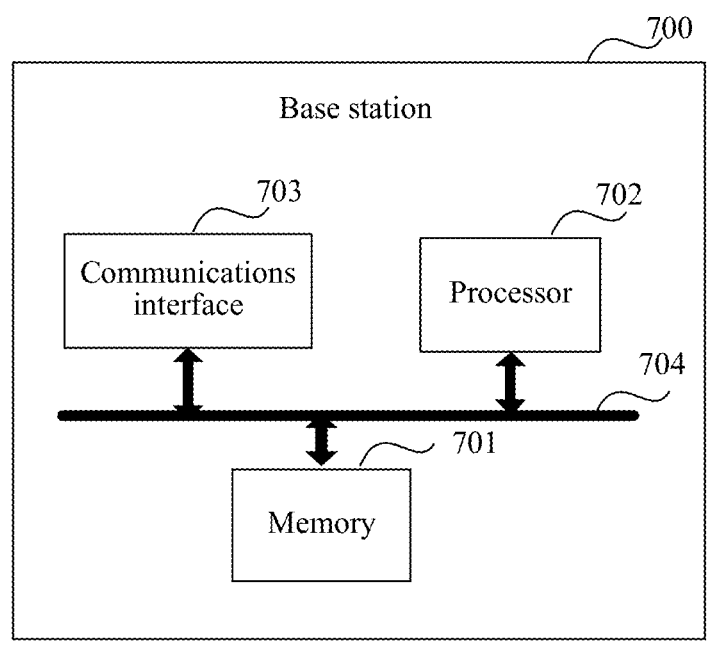
FIG. 7 is a structural diagram of another base station according to an embodiment of the present invention.

When the processing module 601 is a processor, the communications module 602 is a communications interface, and the storage module 603 is a memory, the base station provided in this embodiment of the present invention may be a base station shown in FIG. 7.

Referring to FIG. 7, the base station 700 includes: a processor 702, a communications interface 703, and a memory 701. Optionally, the base station 700 may further include a bus 704. The communications interface 703, the processor 702, and the memory 701 may be connected to each other using the bus 704. The bus 704 may be a peripheral component interconnect (PCI) bus, an extended industry standard architecture (EISA) bus, or the like. The bus 704 may be classified into an address bus, a data bus, a control bus, and the like. For ease of representation, only one thick line is used to represent the bus in FIG. 7, but this does not mean that there is only one bus or only one type of bus.

Figure 8:
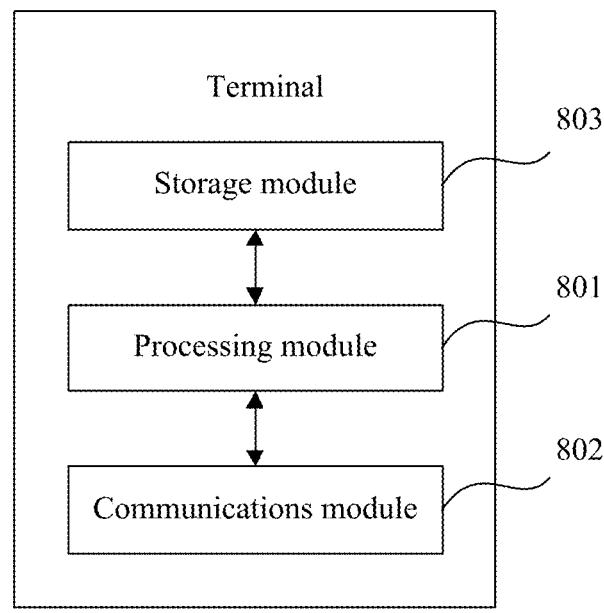
FIG. 8 is a structural diagram of a terminal according to an embodiment of the present invention.

FIG. 8 is a structural diagram of a terminal according to an embodiment of the present invention. The terminal is configured to perform a transmission method using a dynamically adjusted beam set according to an embodiment of the present invention. The terminal includes: a processing module 801 and a communications module 802.

The processing module 801 is configured to: control the communications module 802 to receive first indication information from a base station using first layer signaling, where the first indication information indicates a first beam set; control the communications module 802 to receive second indication information from the base station using second layer signaling, where the second indication information indicates at least one beam in the first beam set; and control the communications module 802 to receive data from the base station using the at least one beam.

In an example, the first layer signaling is higher layer signaling, and the second layer signaling is physical layer signaling or MAC layer signaling.

In an example, the processing module 801 is further configured to: after controlling the communications module 802 to receive the data from the base station using the at least one beam, control the communications module 802 to send beam status information to the base station, where the beam status information indicates whether each of the at least one beam is available.

In an example, the first indication information is a beam index of each beam in the first beam set or a codebook index of each beam in the first beam set.

In an example, the second indication information uses an indication manner of a bitmap that is based on the first beam set.

In an example, the at least one beam is two beams, the processing module 801 is specifically configured to: determine that an SFBC transmit diversity technology is used in a transmission method of the base station; and control the communications module 802 to receive the data from the base station based on two antenna ports.

In an example, the processing module 801 is specifically configured to: determine that a transmission method of the base station is sending the data by cyclically using the at least one beam and sending a reference signal using a common port; and control the communications module 802 to receive the data from the base station by cyclically using the at least one beam, and receive the reference signal using the common port.

In an example, the processing module 801 is specifically configured to control the communications module 802 to receive, from the base station using the at least one beam, the data and a reference signal that are sent by the base station to the terminal by cyclically using the at least one beam.

The terminal may further include a storage module 803, configured to store program code and data of the terminal.

The processing module 801 may be a processor or a controller, such as a central processing unit (CPU), a general-purpose processor, a digital signal processor (DSP), an application-specific integrated circuit (ASIC), a field programmable gate array (FPGA), or another programmable logical device, a transistor logical device, a hardware component, or a combination thereof. The controller/processor may implement or execute various example logical blocks, modules, and circuits described with reference to content disclosed in the present invention. Alternatively, the processor may be a combination of processors implementing a computing function, for example, a combination of one or more microprocessors, or a combination of the DSP and a microprocessor. The communications module 802 may be a communications interface, a transceiver, a transceiver circuit, or the like. The communications interface is a general term, and may include one or more interfaces. The storage module 803 may be a memory.

Figure 9:
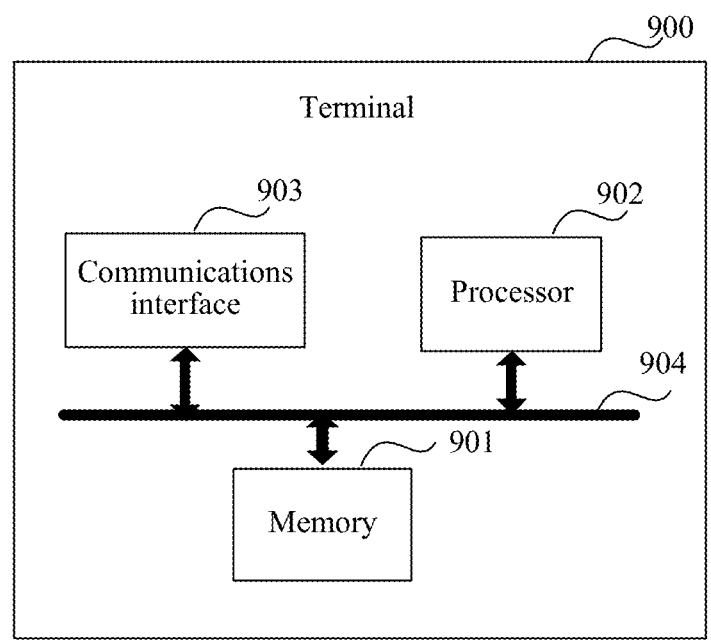
FIG. 9 is a structural diagram of another terminal according to an embodiment of the present invention.

When the processing module 801 is a processor, the communications module 802 is a communications interface, and the storage module 803 is a memory, the terminal provided in this embodiment of the present invention may be a terminal shown in FIG. 9.

Referring to FIG. 9, the terminal 900 includes: a processor 902, a communications interface 903, and a memory 901. Optionally, the terminal 900 may further include a bus 904. The communications interface 903, the processor 902, and the memory 901 may be connected to each other using the bus 904. The bus 904 may be a peripheral component interconnect (PCI) bus, an extended industry standard architecture (EISA) bus, or the like. The bus 904 may be classified into an address bus, a data bus, a control bus, and the like. For ease of representation, only one thick line is used to represent the bus in FIG. 9, but this does not mean that there is only one bus or only one type of bus.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or a part of the steps in each of the foregoing method of the embodiments may be implemented by a program instructing a processor. The foregoing program may be stored in a computer readable storage medium. The storage medium may be a non-transitory medium, such as a random-access memory, a read-only memory, a flash memory, a hard disk, a solid state drive, a magnetic tape, a floppy disk, or an optical disc, or any combination thereof. The foregoing descriptions are merely better specific embodiments of the present invention, but are not intended to limit the protection scope of the present invention.

What is claimed is:

1. A transmission method, comprising:
sending, by a base station, first indication information to a terminal using first layer signaling, wherein the first indication information indicates a first beam set;
sending, by the base station, second indication information to the terminal using second layer signaling, wherein the second indication information indicates at least one beam in the first beam set; and
sending, by the base station, a signal to the terminal using the at least one beam.

2. The method according to claim 1, wherein the first layer signaling is higher layer signaling, and the second layer signaling is physical layer signaling or Media Access Control (MAC) layer signaling.

3. The method according to claim 1, wherein the signal comprises data or a reference signal, and after the sending, by the base station, a signal to the terminal using the at least one beam, the method further comprises:
receiving, by the base station, beam status information sent by the terminal, wherein the beam status information indicates whether each of the at least one beam is available.

4. The method according to claim 1, wherein the first indication information is a beam index of each beam in the first beam set or a codebook index of each beam in the first beam set.

5. The method according to claim 1, wherein the second indication information uses an indication manner of a bitmap that is based on the first beam set.

6. The method according to claim 1, wherein the signal comprises data and a reference signal, and the sending, by the base station, a signal to the terminal using the at least one beam comprises:
sending, by the base station, the data and the reference signal to the terminal by cyclically using the at least one beam.

7. A receiving method, comprising:
receiving, by a terminal, first indication information from a base station using first layer signaling, wherein the first indication information indicates a first beam set;
receiving, by the terminal, second indication information from the base station using second layer signaling, wherein the second indication information indicates at least one beam in the first beam set; and
receiving, by the terminal, a signal from the base station using the at least one beam.

8. The method according to claim 7, wherein the first layer signaling is higher layer signaling, and the second layer signaling is physical layer signaling or Media Access Control (MAC) layer signaling.

9. The method according to claim 7, wherein the signal comprises data or a reference signal, and after the receiving, by the terminal, a signal from the base station using the at least one beam, the method further comprises:
sending, by the terminal, beam status information to the base station, wherein the beam status information indicates whether each of the at least one beam is available.

10. The method according to claim 7, wherein the first indication information is a beam index of each beam in the first beam set or a codebook index of each beam in the first beam set.

11. The method according to claim 7, wherein the second indication information uses an indication manner of a bitmap that is based on the first beam set.

12. The method according to claim 7, wherein the at least one beam is two beams, and the receiving, by the terminal, signal from the base station using the two beams comprises:
determining, by the terminal, that a space frequency block coding (SFBC) transmit diversity technology is used in a transmission method of the base station; and
receiving, by the terminal, the signal from the base station based on two antenna ports.

13. The method according to claim 7, wherein the signal comprises data, and the receiving, by the terminal, a signal from the base station using the at least one beam comprises:
determining, by the terminal, that a transmission method of the base station is sending the data by cyclically using the at least one beam and sending a reference signal using a common port; and
receiving, by the terminal, the data from the base station by cyclically using the at least one beam, and receiving the reference signal using the common port.

14. The method according to claim 7, wherein the signal comprises data and a reference signal, and the receiving, by the terminal, a signal from the base station using the at least one beam comprises:
receiving, by the terminal from the base station using the at least one beam, the data and the reference signal that are sent by the base station to the terminal by cyclically using the at least one beam.

15. A terminal, comprising: at least one processor, and a transceiver, wherein
the at least one processor is configured to:
control the transceiver to receive first indication information from a base station using first layer signaling, wherein the first indication information indicates a first beam set;
control the transceiver to receive second indication information from the base station using second layer signaling, wherein the second indication information indicates at least one beam in the first beam set; and
control the transceiver to receive a signal from the base station using the at least one beam.

16. The terminal according to claim 15, wherein the first layer signaling is higher layer signaling, and the second layer signaling is physical layer signaling or Media Access Control (MAC) layer signaling.

17. The terminal according to claim 15, wherein the signal comprises data or a reference signal, and the at least one processor is further configured to: after controlling the transceiver to receive the signal from the base station using the at least one beam, control the transceiver to send beam status information to the base station, wherein the beam status information indicates whether each of the at least one beam is available.

18. The terminal according to claim 15, wherein the first indication information is a beam index of each beam in the first beam set or a codebook index of each beam in the first beam set.

19. The terminal according to claim 15, wherein the second indication information uses an indication manner of a bitmap that is based on the first beam set.

20. The terminal according to claim 15, wherein the signal comprises data and a reference signal, and the at least one processor is configured to control the transceiver to receive, from the base station using the at least one beam, the data and the reference signal that are sent by the base station to the terminal by cyclically using the at least one beam.

* * * * *